(12) United States Patent
Sebastian

(10) Patent No.: US 7,782,794 B2
(45) Date of Patent: Aug. 24, 2010

(54) METHODS AND SYSTEMS FOR BANDWIDTH MEASUREMENT TECHNIQUES

(75) Inventor: William B. Sebastian, Quincy, MA (US)

(73) Assignee: ViaSat, Inc., Carlsbad, CA (US)

( * ) Notice: Subject to any disclaimer, the term of this patent is extended or adjusted under 35 U.S.C. 154(b) by 211 days.

(21) Appl. No.: 12/172,925

(22) Filed: Jul. 14, 2008

(65) Prior Publication Data

US 2009/0016240 A1 Jan. 15, 2009

Related U.S. Application Data

(60) Provisional application No. 60/949,495, filed on Jul. 12, 2007.

(51) Int. Cl.
*H04L 12/26* (2006.01)
(52) U.S. Cl. .................. 370/253; 370/252; 370/241
(58) Field of Classification Search ............ 370/241, 370/252, 253
See application file for complete search history.

(56) References Cited

U.S. PATENT DOCUMENTS

| | | | | |
|---|---|---|---|---|
| 6,584,567 | B1 * | 6/2003 | Bellwood et al. | 713/171 |
| 6,701,372 | B2 * | 3/2004 | Yano et al. | 709/232 |
| 6,850,541 | B2 * | 2/2005 | Gross | 370/473 |
| 7,266,613 | B1 * | 9/2007 | Brown et al. | 709/235 |
| 7,443,804 | B2 * | 10/2008 | Cheung et al. | 370/252 |
| 2003/0061387 | A1 | 3/2003 | Brown et al. | |
| 2005/0071876 | A1 * | 3/2005 | van Beek | 725/62 |
| 2005/0177866 | A1 | 8/2005 | Kirsch | |

FOREIGN PATENT DOCUMENTS

WO  WO 01/03398 A  1/2001

OTHER PUBLICATIONS

PCT International Search Report and Written Opinion mailed Mar. 11, 2009, International Publication No. PCT/US2008/078161, 12 pages.
U.S. Appl. No. 12/252,181, filed Oct. 15, 2008.

* cited by examiner

*Primary Examiner*—Chi H Pham
*Assistant Examiner*—Robert Lopata
(74) *Attorney, Agent, or Firm*—Townsend and Townsend and Crew LLP

(57) ABSTRACT

The present invention relates to systems, apparatus, and methods of measuring bandwidth of a network connection. The method includes establishing a network connection between a sending terminal and a receiving terminal. The method further includes inserting a flag into a packet header for a packet. The flag is to indicate to the receiving terminal that a bandwidth measurement is in progress. The packet also includes a payload. The method further includes setting the flag in the packets header of the packet to true, and transmitting to the receiving terminal the packet. The method then sums arrival times of the packet and the payload for the packet, and calculates the bandwidth measurement of the network connection by dividing the summed payload value by the summed arrival times value.

20 Claims, 7 Drawing Sheets

METHODS AND SYSTEMS FOR BANDWIDTH MEASUREMENT TECHNIQUES

PRIORITY CLAIM

This application claims priority to U.S. Provisional Patent Application Ser. No. 60/949,495, filed Jul. 12, 2007, entitled "METHODS AND SYSTEMS FOR BANDWIDTH MEASUREMENT", which is hereby incorporated be reference herein in its entirety for any purpose.

FIELD OF THE INVENTION

The present invention relates, in general, to network acceleration and, more particularly, to bandwidth measurement techniques.

BACKGROUND

Presently, network bandwidth measurements are calculated by transmitting artificial test packets across the network link. These artificial test packets present a number of problems for the link being measured. One problem is that test packets add additional traffic across the link.

In addition to the test packets being transmitted, "start test" and "stop test" packets must be transmitted across the link. These packets are used to inform a receiving terminal that the next burst of packets is for bandwidth testing purposes. These packets, as with the test packets, also create additional traffic across the link.

Additionally, current bandwidth testing techniques do not produce complexly accurate results. The test packets add to the traffic across the link which can introduce artificial delays. Also, because bandwidth changes over time, a single test burst of packets is not necessarily an accurate reflection of the link's bandwidth (i.e. at the time of the test burst congestion on the link was abnormally high or low). Consequently, the test must be run repeatedly to reflect the bandwidth changes which is not always possible and/or practical.

BRIEF SUMMARY

Embodiments of the present invention are directed to a method of measuring bandwidth of a network connection. The method includes establishing a network connection between a sending terminal and a receiving terminal. The method further includes inserting a flag into a packet header for a packet. The flag is to indicate to the receiving terminal that a bandwidth measurement is in progress. The packet also includes a payload. The method further includes setting the flag in the packets header of the packet to true and transmitting to the receiving terminal the packet. The method then sums arrival times of the packet and the payload for the packet, and calculates the bandwidth measurement of the network connection by dividing the summed payload value by the summed arrival times value.

According to further embodiments, a system for measuring bandwidth of a network connection is described. The system includes a sending device which is configured to insert a transport header flag into a packet, and determine if a time interval since the packet was transmitted is greater than a threshold. The sending device is further configured to based on the time interval being greater than the threshold, set the transport header flag to true, and transmit the packet.

The system further includes a receiving device coupled with the sending device. The receiving device is configured to receive the packet, store the arrival time of the packet, and store the transport header. The receiving device is further configured to for each packet with the flag set to true, accumulate the packets size and inter packet arrival time, calculate a total bytes divided by a total time, and generate a bandwidth report.

In an alternative embodiment, a machine-readable medium is described. The machine-readable medium includes instructions for establishing a network connection between a sending terminal and a receiving terminal. The machine-readable medium further includes instructions for inserting a flag into a packet header for a packet. The flag is to indicate to the receiving terminal that a bandwidth measurement is in progress. The packet also includes a payload. The machine-readable medium further includes instructions for setting the flag in the packets header of the packet to true, and transmitting to the receiving terminal the packet. The machine-readable medium then includes instructions for summing arrival times of the packet and the payload for the packet, and calculating the bandwidth measurement of the network connection by dividing the summed payload value by the summed arrival times value.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the invention relate to measuring bandwidth by using packets already being transmitted over a link. In other words, the bandwidth may be measured without introducing artificial test packets. In one embodiment, this type of bandwidth measurement may be achieved by incorporating a flag into the packet header. The flag may be a negligible size (e.g., 1-bit); however, any appropriative size may be used. The 1-bit flag has a minimal impact on packet overhead and does not interfere with traffic on the link. Measuring bandwidth in accordance with this invention may incorporate methods and systems disclosed in a co-pending U.S. Patent Application entitled, "METHODS AND SYSTEMS FOR IMPLEMENTING TIME-SLICE FLOW CONTROL", filed concurrently herewith, which is incorporated by reference for any and all purposes.

Figure 1:
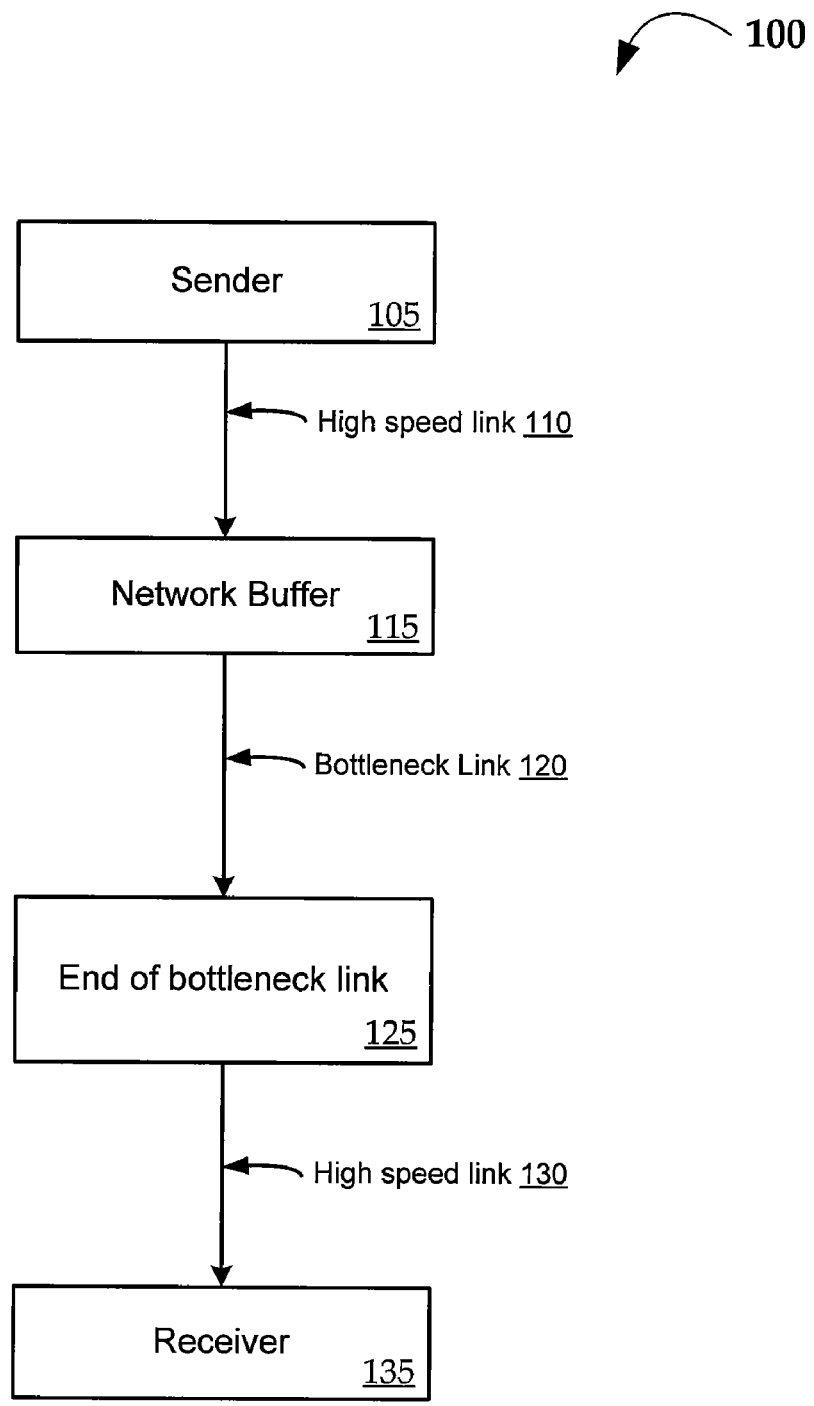
FIG. 1 is a flow diagram illustrating a system for performing bandwidth measurements, according to embodiments of the present invention.

Turning now to FIG. 1 which illustrates a network 100 according to aspects of the invention. In one embodiment, network 100 includes a sender 105. Sender 105 may initiate the flow of packets into network 100. Sender 105 may also insert the flag (i.e., 1-bit flag) into the packet headers before transmitting them. Furthermore, sender 105 may use network transport layer 4 to transmit the packets.

Network 100 may also include a receiver 135. Receiver 135 may be configured to receive the packets transmitted by sender 105. In addition, receiver 135 may also be configured to perform bandwidth measurements for network 100. In a further embodiment, network 100 may include a bottleneck link 120 which is a bandwidth-limited link that limits the bandwidth rate at which data may be transmitted between sender 105 and receiver 135. Bottleneck link 120 may occur at any time and be located at any point between sender 105 and receiver 135. In other words, bottleneck link 120 may be any link on network 100 where the bandwidth is limited.

Figure 2:
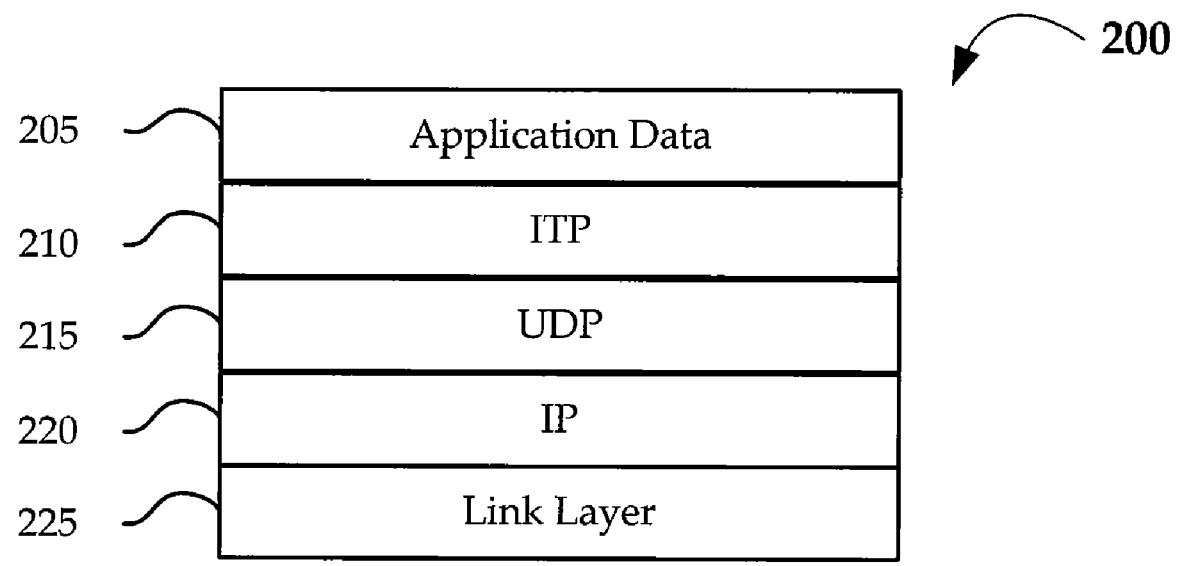
FIG. 2 is a block diagram illustrating a method of performing bandwidth measurements, according to one embodiment of the present invention.

One embodiment of the invention is to determine the maximum bandwidth of bottleneck link 120. The bandwidth of bottleneck link 120 may be the maximum rate in which packets are able to be transmitted between sender 105 and receiver 135. The bandwidth information can then be utilized by applications (i.e., application data layer 205 in FIG. 2) when transmitting packets associated with the application.

In a further embodiment, network 100 may include a network buffer 115. Network buffer 115 may work in conjunction with bottleneck link 120 in order to accumulate a number of packets and emit them into bottleneck link 120 as quickly as the bottleneck is able to accept them. In one embodiment, network buffer 115 may be located in, for example, a modem, a network router, a network switch, on link/physical layers 1 and 2, or any other network junction point. In a further embodiment, network buffer 115 may employ a variety of algorithms to determine which packets to discard when the buffer is filled at a faster rate then bottleneck link 120 can accept packets.

Network 100 may also include a location within the network referred to as the end of the bottleneck 125. The end of the bottleneck 125 may be a network device that receives packets after bottlenecked [in FIG. 1] 120. In one embodiment, the device at end of bottleneck 125 does not require buffering; however, if the flow of the network traffic is reversed, then the device may include a buffer.

In a further embodiment, network 100 may include high speed link 110. In one embodiment, high speed link 110 is located between sender 105 and network buffer 115. Link 110 is a "high-speed" link because it is faster than bottleneck link 120. This link may be, for example, a local bus connected to a modem on the same computer system or it may be a link across the backbone of the Internet. Furthermore, network 100 may also include high speed link 130. High speed link 130 is similar to high speed link 110; except that it is located between end of bottleneck 125 and receiver 135.

According to further aspects of the invention, the packets may be transmitted over a protocol stack. In one embodiment, a network protocol, according to embodiments of the invention, is added to the protocol stack in order to facilitate bandwidth measurement. The protocol may be inserted onto the stack to sit on top of the user datagram protocol (UDP) 215 layer as show in protocol stack 200 of FIG. 2. In one embodiment, the protocol may be Intelligent Compression Technology's® (ICT) transport protocol (ITP)® 210 sitting on top of UDP layer 215. The UDP protocol is recognized and supported by many network types, and also provides a port address for level-4 switching devices. However, because UDP does not provide reliable delivery, packet sequencing, or flow control, therefore, ITP is placed on top of UDP to provide these and other functions.

Protocol stack 200 may also include link layer 225 (e.g., a physical link, a virtual link, etc.), Internet protocol (IP) layer 220 (e.g., for access to the world wide web, the Internet, etc.) and application data layer 205 (e.g., web browser, email client, etc.). Nonetheless, additional and/or alternative protocols and layers may be used and/or added.

In one embodiment, ITP 210 may compress data received from application data layer 205. Further, the ITP 210 protocol may be configured to provide fast delivery of compressed data. ITP 210 may also provide a buffering system that implements multiple queues at different priority levels. The queues may be configured to allow high priority packets to be delivered at a faster rate than low priority packets. A further feature of ITP 210 is that it is configured to be able to send partial packets. Partial packets may be sent when no additional data is coming to fill up the packets, as opposed to delaying transmission in order to wait to transmit a full packet.

Additionally, ITP 210 is configured to account for packets on a per-packet basis as opposed to a per-stream basis utilized by some protocol (e.g., the transmission control protocol (TCP)). Using a per-packet accounting process allows for a more efficient use of the "send window." The send window defines the maximum amount of unacknowledged data that may be transmitted over a link. For example, with TCP, a single dropped packet at the edge of the send window may stop transmission completely until acknowledgment for that packet is finally received. In contrast, because ITP 210 calculates the total size of all outstanding unacknowledged packets when creating its send window size, individual dropped packets do not affect the flow of packets. As such, ITP 210 is able to continue to transmit packets without waiting for an acknowledgment for a single packet.

Tracking of individual packets further allows for more efficient handling of lost packets. For example, if packets 1-50 have been transmitted and packets 10, 20, 30, 40 and 50 have been dropped, ITP 210 is configured to re-transmit each of the dropped packets without being required to wait for acknowledgments for the other dropped packets. Stated differently, with ITP 210 dropped packets may be re-transmitted independently of other dropped packets.

In a further embodiment, the ITP 210 protocol further provides for in-depth modeling of link layer 225. ITP 210 allows for detailed and accurate bandwidth calculations which may be inserted into the packet header. This bandwidth information may then be used to transmit packets at an optimum rate for the specified link.

In another embodiment, ITP 210 provides for effective flow control of packets. ITP 210 may be configured to regulate the rate at which packets are transmitted across a link. Transmitting packets at too slow of a rate can cause unnecessary delays in transmission. Conversely, transmitting packets at too fast a rate can cause packets to be dropped. Accordingly, in one embodiment, the ITP 210 protocol uses bandwidth information for the link to determine the optimal send rate to maximize transmission of packets without causing packets to be dropped.

An additional feature of the ITP 210 protocol is that it is an "application-aware" protocol. As such, ITP 210 is configured to optimize transmission of packets based on requirements and/or needs of individual applications. For example, if a certain application requires a small continuous amount of bandwidth (e.g., voice over IP (VoIP), then ITP 210 is able to reserve bandwidth for that application. Further, if another application requires a large amount of bandwidth only at certain isolated instances, ITP 210 may allow that application's packets to be transmitted at a higher priority. Accordingly, ITP 210 can set rules associated with each application type in order to more effectively utilize the available bandwidth of a link.

Figure 3:
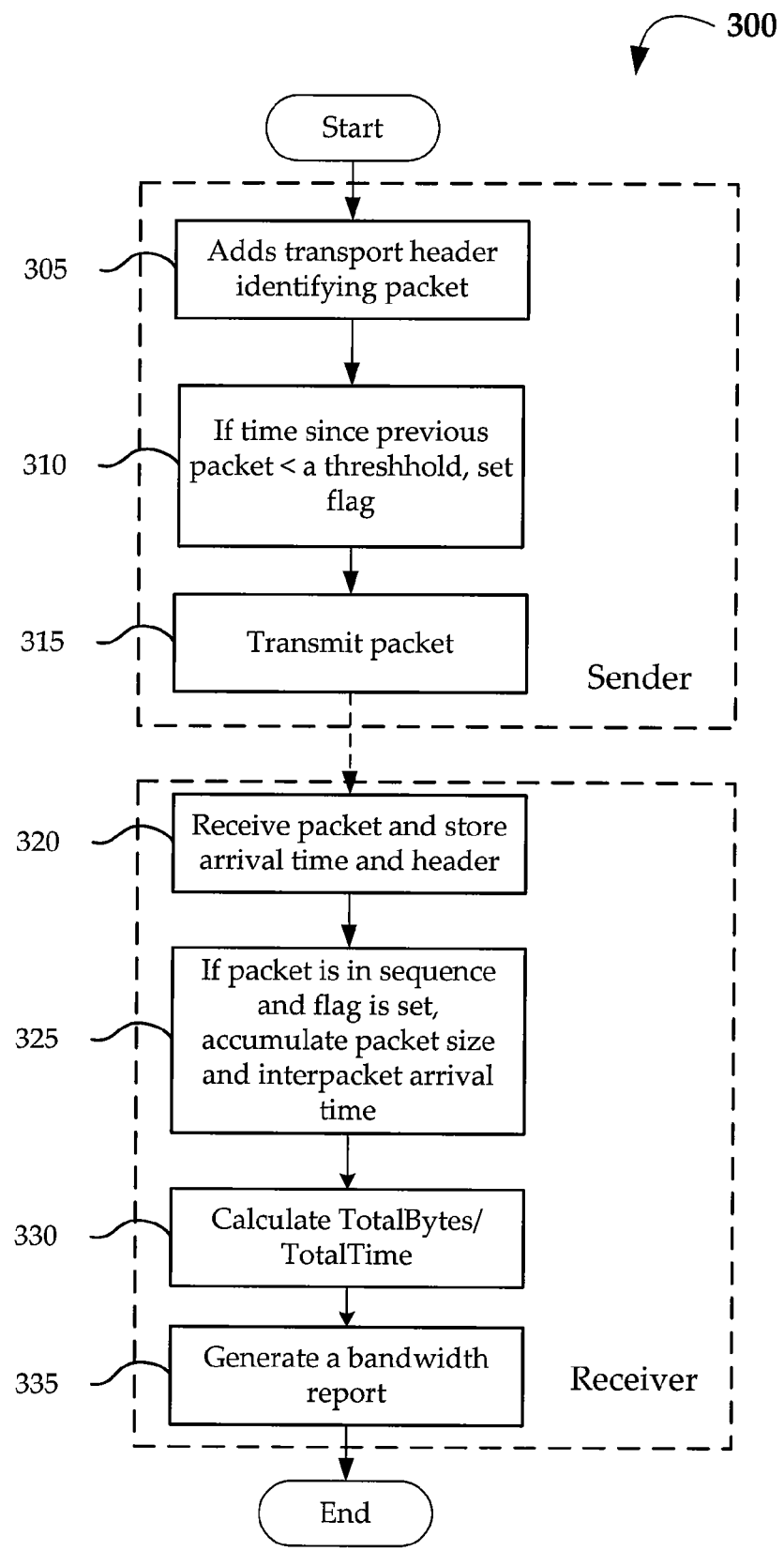
FIG. 3 is a flow diagram illustrating a system for performing bandwidth measurements, according to one embodiment of the present invention.

Consequently, the ITP 210 (FIG. 2) protocol may need to use accurate bandwidth measurements to more effectively transmit packets over a link. FIG. 3 illustrates a method 300 for measuring bandwidth of a link according to embodiments of the invention. At process block 305, a transport header may be used to identify the packet. In one embodiment, the transport header may include a 1-bit flag. At process block 310, it is determined if the time since the previous packet was transmitted is less than a threshold value (e.g., 1 millisecond, 3 milliseconds, 10 milliseconds, etc.). If the time since the previous packet was transmitted is less than the threshold, then the flag is set to true, otherwise the flag is set to false. The flag being set to true indicates to a receiver (e.g., receiver 135 (FIG. 1)) that a bandwidth test has been initiated by a sender (e.g., sender 105 (FIG. 1)).

In one embodiment, a number of packets with the flag set to true are then transmitted according to a SendOffset value (process block 315). In one embodiment, the SendOffset value results in the packets being sent faster than bottleneck link 120 (FIG. 1) is able to send another packet. The packet is temporarily held in network buffer 115 (FIG. 1), and then sent when bottleneck link 120 (FIG. 1) is prepared to receive another packet. Thus, the rate at which packets are sent over bottleneck link 120 (FIG. 1) is the bandwidth of that link and the offset between packets as seen by receiver 135 (FIG. 1) equals the size of the packet divided by the bandwidth of bottleneck link 120 (FIG. 1). According to some embodiments, bandwidth measurements may be more accurate with a faster SendOffset value. Furthermore, the number of flagged packets should be sufficiently large enough to compensate for any variances within the link (e.g., the effect of scheduling algorithms, dropped packets, retransmission of packets, physical problems with the link, etc.)

In one embodiment, the SendOffset may establish a maximum bandwidth that can be measured. This measurement may be determined for a given packet size using the following equation:

$$MaxBandwidth = PacketSize/SendOffset$$

Subsequently, a MaxSendOffset can then be determined. For example, in a network with a maximum transmission unit (MTU) of 1500 bytes, the maximum send offset may be calculated by:

$$MaxSendOffset = PacketSize/MaxBandwidth = MTU/1\ MBps = 1.5\ msecs$$

In an alternative embodiment, the MaxSendOffset may be reduced to 1.0 milliseconds (msecs) in order to improve bandwidth measurement accuracy.

Additionally, in some instances a default SendOffset may be selected in order to simplify the measurement process. Further variations may also be implemented. For example, the packet header may be flagged for any packet size by calculating the MaxSendOffset according to each packet size. Another variation may be to adjust the MaxSendOffset dynamically based on the measured bandwidth. For example, if the bandwidth can be measured up to 1 MByte/sec at a MaxSendOffset of 1 msec, the MaxSendOffset could be reduced to 0.5 msecs in order to be able to measure bandwidth up to 2 MBytes/sec.

In one embodiment, in order for measurements to be valid, the receiver needs to know the equation and parameters associated with the MaxSendOffset. However, if the use of the bandwidth measurement is only to report back to the sender, then the receiver can report back to the sender, and then the sender can perform the validity calculations. The validity calculations may then be based on how close the measured bandwidth is to the MaxBandwidth.

The flagging of packets enables the sender and/or receiver to gather enough information to generate an accurate bandwidth measurement. The time interval may be altered depending on the type of link and/or the desired bandwidth measurement accuracy.

In one embodiment, the receiver may store the arrival time and the packet header for each of the received flagged packets (process block 320). If a packet is in sequence and its flag is set to true, then the packet size is added to an accumulated packet size total (i.e., TotalBytes) and the arrival time is added to an accumulated interpacket arrival time value (i.e., TotalTime) (process block 325). Consequently, no "special" packets are required to determine the bandwidth test start and stop points. In one embodiment, the TotalBytes is divided by the TotalTime in order to calculate a bandwidth measurement across the link (process block 330).

In one embodiment, the receiver may continue to calculate the bandwidth measurement until a sufficient amount of data has been collected for an accurate bandwidth reading. The amount of data needed to provide an accurate reading may vary based on a number of factors such as link type, maximum bandwidth, desired accuracy of results, congestion of the link, etc. Once the receiving terminal has a sufficient amount of information, a bandwidth report may be generated and then transmitted to the sending terminal (process block 335).

In one embodiment, the bandwidth report is archived and multiple reports may be used to generate a more comprehensive report. The reports may be used to identify and/or diagnose problems over a network link. In one embodiment, a user or system administrator may be able to view the reports at a user interface. In a further embodiment, the user interface may be web-based.

In another embodiment, the report may be used by the ITP 210 (FIG. 2) protocol in order to optimize the performance of a link. Transmitting the report may occur on a set time interval. For example, the report may be transmitted, merely by way of example, every ten minutes. Alternatively, or in addition, the reports may be transmitted when the measured bandwidth differs from the previously reported value by more than a predetermined amount.

Figure 4A:
FIGS. 4A, 4B, and 4C are block diagrams illustrating bandwidth measurements techniques, according to one embodiment of the present invention.
Figure 4B:
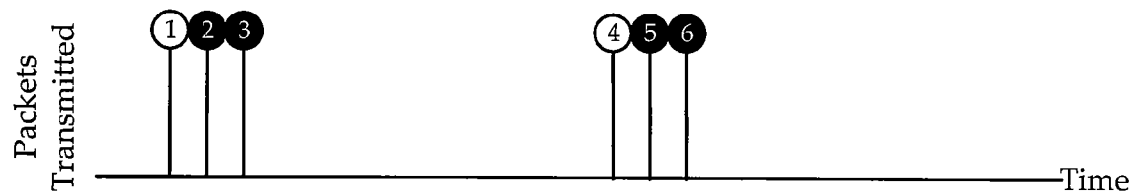

Referring now to FIGS. 4A and 4B which illustrate packets that have been flagged in order to be used for bandwidth measurement calculations. FIG. 4A illustrates a first packet with its 1-bit flag set to false (i.e. a white circle) and packets 2-N with their 1-bit flag set to true (i.e. a black circle). The packets are transmitted in a single burst in rapid succession by the sending terminal. The 1-bit flag indicates to the receiving terminal that packet 1 is not to be used for bandwidth calculation purposes, whereas packets 2-N are to be used for bandwidth calculation (even though packets 2-N are packets that would normally be transmitted). As the receiving terminal receives packets 2-N, the receiving terminal calculates the transmission time intervals of each packet in order to generate a bandwidth measurement for the link.

FIG. 4B illustrates a situation where there is a break between the transmission of flagged packets. In one embodiment, the break is attributed to a network buffer (e.g., network buffer 115 (FIG. 1)) storing packets 2 and 3 and waiting to release them until the link (e.g., bottleneck link 120 (FIG. 1)) can accept them. Otherwise, if the link was not ready to receive packets 2 and 3 and they were transmitted anyway, the link would drop the packets. Such breaks in transmission may be normal occurrences and may be caused by other situations. For example, if a user is browsing a web page, there may be a significant number of packets transmitted upon arriving at the initial page. However, after the page has been loaded, transmission of packets may slow down significantly or even stop for a period of time. More packets may not be transmitted until the user has clicked on, for example, a link which causes more packets to be transmitted in order to render the new page. Such breaks in packet transmission can cause inaccurate bandwidth measurements.

However, as shown in FIG. 4B, because of the 1-bit flag the receiving terminal is able to differentiate between a slow link and a break in packet transmissions. The flag for packets 2 and 3 is set to true indicating that a test is in progress. Normally, the delay between packets 3 and 4 might indicate a low bandwidth link; however, since packet 4's flag is set to false, the receiving terminal does not include the delay between packets 3 and 4 in its bandwidth calculation. This delay would provide inaccurate results because it is due to inactivity as opposed to a slow link.

Furthermore, upon receipt of packet 5, the receiving terminal would begin another test for bandwidth calculation. In one embodiment, after enough smaller bandwidth calculations are aggregated together, an accurate bandwidth measurement can be calculated. Accordingly, the averaging over a larger number of samples causes the total to more accurately reflect the bandwidth of the link.

Accordingly, by using this bandwidth measurement technique, a contiguous burst of packets is not required. Instead, by consistently calculating the bandwidth of smaller bursts of packets in the normal course of packet transmission, an accurate bandwidth measurement for the link may be calculated.

In some instances, the bandwidth of a link may be affected by constraints placed on the link itself. For example, the link may not be permitted to utilize all of its potential bandwidth. In some instances the link is being shared by multiple users, which causes some users to have higher bandwidth in some instances and lower bandwidth in other instances. This type of fluctuation in bandwidth may cause a bandwidth test to generate inaccurate results. However, because the bandwidth is continuously calculated with smaller bursts of packets, such inconstancies are averaged out of the overall bandwidth calculation.

Figure 4C:
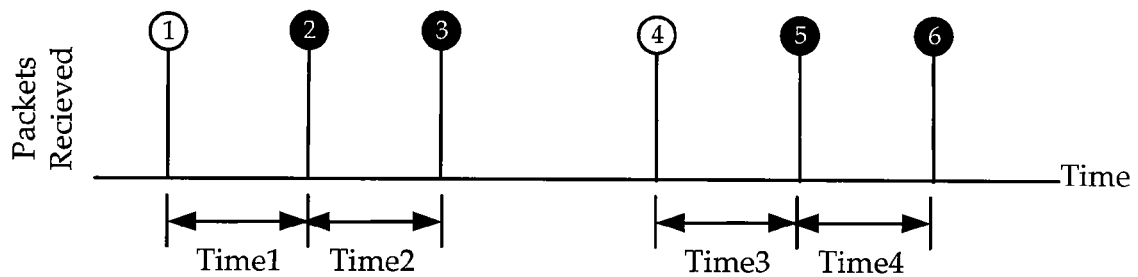

FIG. 4C illustrates how the receiving terminal may receive the packets transmitted in FIG. 4B. Normally, the delay between packets 3 and 4 would be figured into the bandwidth measurement calculations for the link. However, because of the 1-bit flag in the packet header, the receiving terminal knows that the time between packets 3 and 4 should not be figured into any of the bandwidth calculations. Instead, inter-packets arrival times time1, time2, time3 and time4 are used to calculate the bandwidth of the link. By only calculating these times, that calculation is more accurate and better reflects the actual bandwidth of the link. The accurate bandwidth measurement can then be used to optimize transmission performance on the link, for example, when using the ITP 210 (FIG. 2) protocol as discussed above.

Figure 5A:
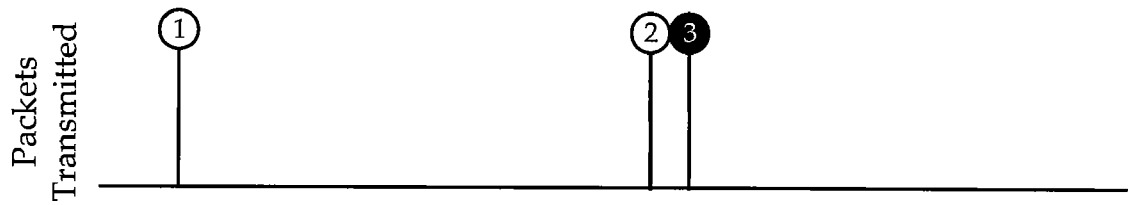
FIGS. 5A and 5B are block diagrams illustrating bandwidth measurements techniques, according to one embodiment of the present invention.
Figure 5B:
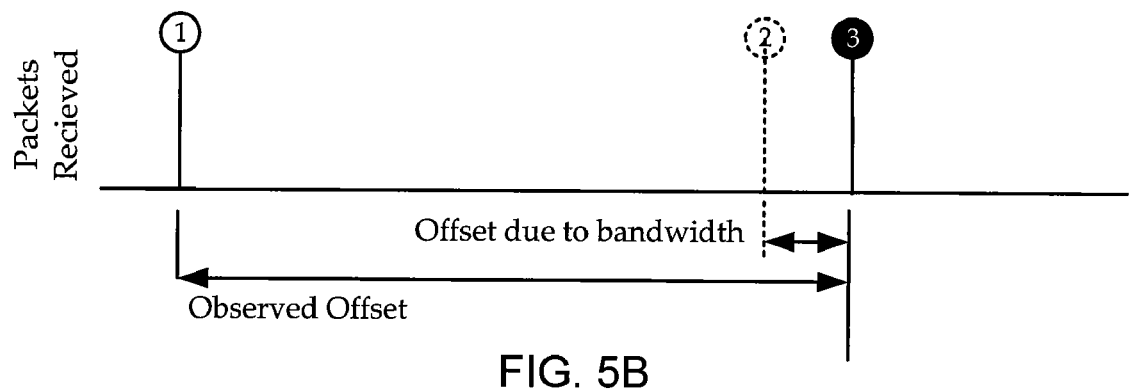

Turning now to FIG. 5A which illustrates transmission of packets in accordance with embodiments of the invention. Often, when packets are transmitted across a link, the packets are dropped or possibly re-ordered during transit. FIG. 5A illustrates a sender emitting packet 1 and then after a certain period of time the sender emits packets 2 and 3 in quick succession. Packet 3 has its flag (e.g., the 1-bit flag) set to true and packet 2 is dropped in transit. Consequently, the receiver gets packet 1 followed by packet 3. FIG. 5B illustrates a dashed packet 2 demonstrating where the packet would have been received had it not been dropped. Accordingly, because packet 2 was dropped, the "observed offset" by the receiver would indicate that the link has very low bandwidth. However, the offset due to bandwidth may be much shorter, indicating a much higher bandwidth.

Often packets may be reordered or dropped during the transit over the network and a bandwidth measurement may only be valid if the receiver is measuring the offset from the correct packet. This can be insured by using information in the packet header which indicates the sequence in which the packets were originally sent. For example, the TCP header provides a sequence number that can be used for such a purpose. However, the sequence number may only reflect the position of the packet in the stream but does not indicate whether a packet has been re-transmitted. In one embodiment, in order to ensure accurate bandwidth calculations an additional flag may be inserted into the packet header. The flag may be used to indicate whether the packet is a re-transmitted packet. If the re-transmit flag is set to true, then the receiver knows not to use that packet when making its bandwidth measurement calculation.

A number of variations and modifications of the disclosed embodiments can also be used. For example, the bandwidth techniques described herein may be used in multiple networking environments (e.g., local area networks (LANs), wide area networks (WANs), storage area networks (SANs), cellular networks, wireless networks, satellite networks. etc.) Furthermore, various network protocols may be used individually or in conjunction with other protocols (hyper-text transfer protocol (HTTP), compressed HTTP, file transfer protocol (FTP), UDP, TCP, etc.). It should be appreciated that additional network types and/or network protocols not specifically mentioned may be used.

Figure 6:
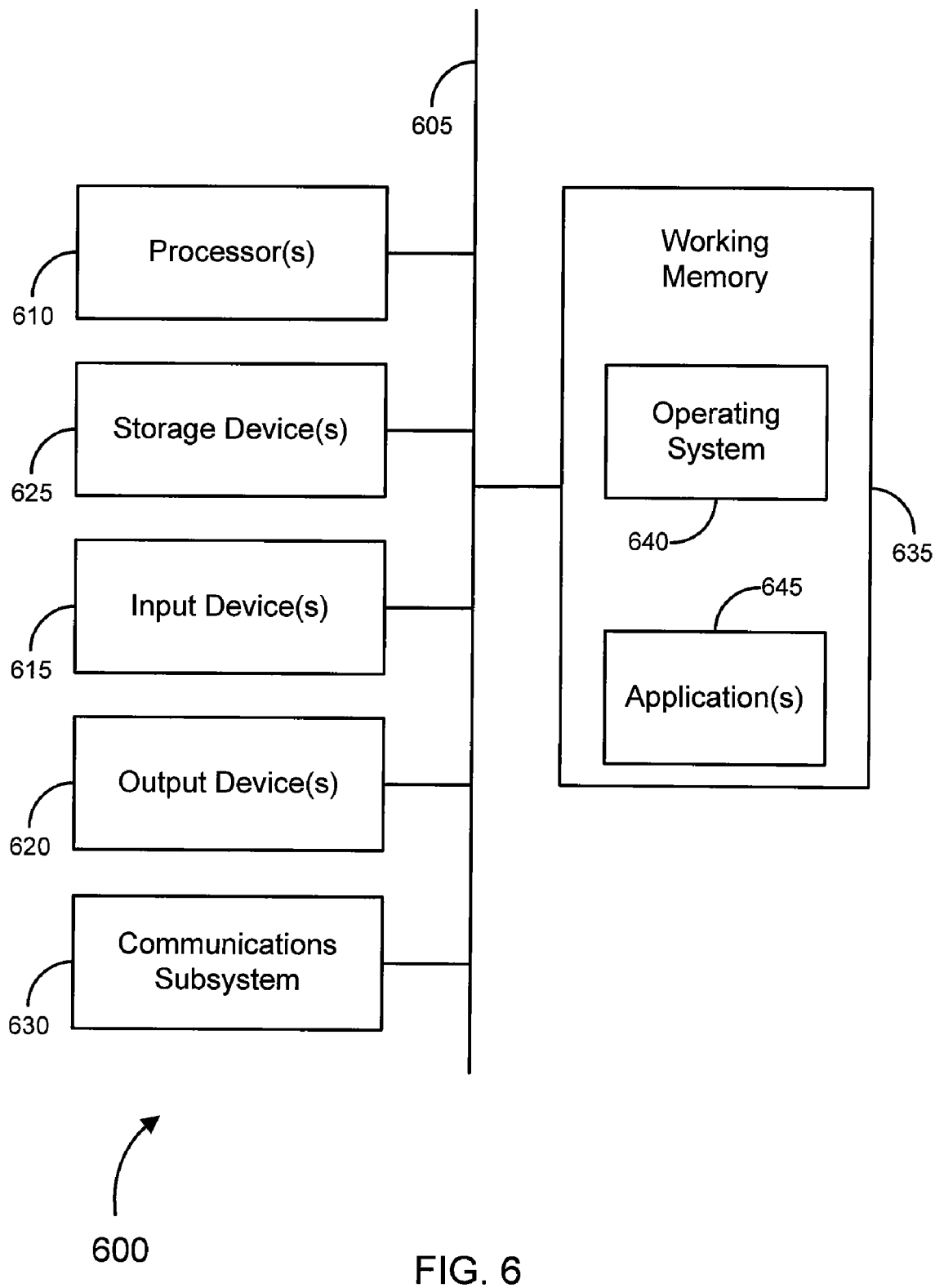
FIG. 6 is a generalized schematic diagram illustrating a computer system, in accordance with various embodiments of the invention.

FIG. 6 provides a schematic illustration of one embodiment of a computer system 600 that can perform the methods of the invention, as described herein, and/or can function, for example, as any part of sender 105 or receiver 135 of FIG. 1. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640 and/or other code, such as one or more application programs 645, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
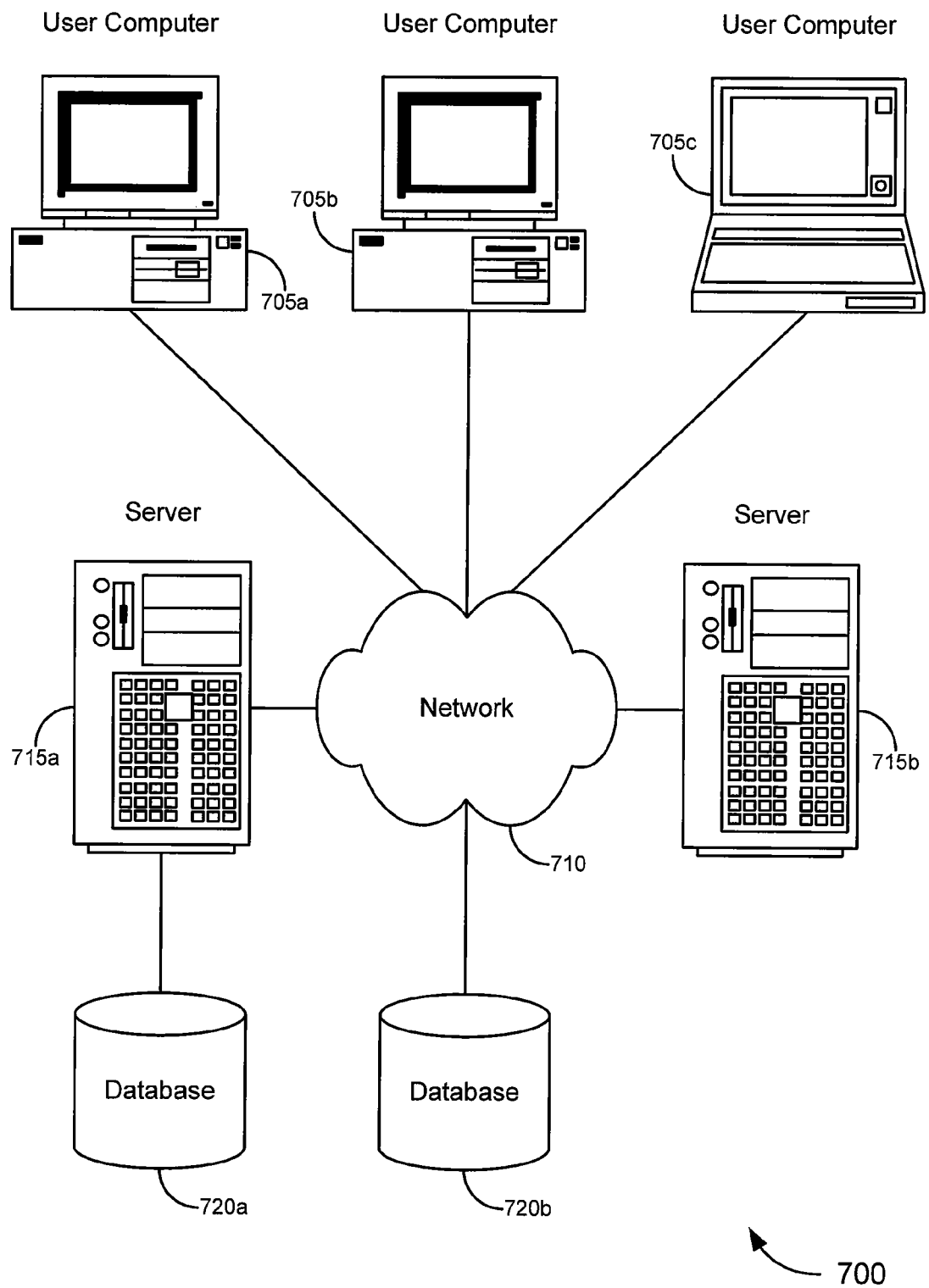
FIG. 7 is a block diagram illustrating a networked system of computers, which can be used in accordance with various embodiments of the invention.

A set of embodiments comprises systems for implementing staged configurator modeling. In one embodiment, proxy server 320 and/or client 305, (as shown in FIG. 3), may be implemented as computer system 600 in FIG. 6. Merely by way of example, FIG. 7 illustrates a schematic diagram of a system 700 that can be used in accordance with one set of embodiments. The system 700 can include one or more user computers 705. The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computers 705, any number of user computers can be supported.

Certain embodiments of the invention operate in a networked environment, which can include a network 710. The network 710 can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a web server, which can be used, merely by way of example, to process requests for web pages or other electronic documents from user computers 705. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 705 to perform methods of the invention.

The server computers 715, in some embodiments, might include one or more application servers, which can include one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 705 and/or another server 715. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement methods of the invention incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as the database can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of measuring bandwidth of a network connection, the method comprising:
    establishing the network connection between a sending terminal and a receiving terminal;
    inserting a flag into a packet header for at least one packet, wherein the flag is to indicate to the receiving terminal that a bandwidth measurement is in progress, wherein the at least one packet includes a payload;
    determining if a time interval since a previous packet was transmitted is less than a threshold, based on the time interval being less than the threshold setting the flag in the packets header of the at least one packet to true;
    transmitting to the receiving terminal the at least one packet;
    storing the arrival time of the at least one packet;
    storing the packet header, for each packet with the flag set to true;
    summing arrival times of the at least one packet and the payload for the at least one packet; and
    calculating the bandwidth measurement of the network connection by dividing the summed payload value by the summed arrival times value;
    generating a bandwidth report.

2. The method of measuring bandwidth of a network connection as recited in claim 1, further comprising setting the flag in each of the packet headers in a plurality of packets to false.

3. The method of measuring bandwidth of a network connection as recited in claim 2, wherein the setting of the flag to false indicates to the receiving terminal that a bandwidth test is not being initiated.

4. The method of measuring bandwidth of a network connection as recited in claim 3, wherein the setting of the flag to true indicates to the receiving terminal that a bandwidth test is being initiated.

5. The method of measuring bandwidth of a network connection as recited in claim 4, further comprising establishing a time interval threshold.

6. The method of measuring bandwidth of a network connection as recited in claim 5, wherein the time interval threshold is configured to control the setting of the flag.

7. The method of measuring bandwidth of a network connection as recited in claim 6, further comprising transmitting subsequent packets, wherein if the time interval threshold is not exceeded, then setting the flags of the subsequent packets to true.

8. The method of measuring bandwidth of a network connection as recited in claim 7, wherein if the time interval threshold is exceeded, then setting the flags of the subsequent packets to false.

9. The method of measuring bandwidth of a network connection as recited in claim 1, wherein the at least one packet is transmitted according to a maximum send offset value.

10. The method of measuring bandwidth of a network connection as recited in claim 1, wherein the steps recited in claim 1 are repeated for additional packets, and the bandwidth measurements from the at least one packet and the additional packets are averaged together.

11. The method of measuring bandwidth of a network connection as recited in claim 1, wherein the network connection is established using a protocol running on top of user datagram protocol (UDP).

12. The method of measuring bandwidth of a network connection as recited in claim 1, wherein the flag is a 1-bit flag.

13. The method of measuring bandwidth of a network connection as recited in claim 1, wherein, based on a predetermined amount of time, flags of subsequent packets are set to true.

14. The method of measuring bandwidth of a network connection as recited in claim 1, further comprising generating a report indicating the bandwidth measurement of the network connection.

15. A system for measuring bandwidth of a network connection, the system comprising:
    a sending device configured to insert a transport header flag into a packet, determine if a time interval since the packet was transmitted is greater than a threshold,
    based on the time interval being less than the threshold,
    set the transport header flag to true, and
    transmit the packet; and a receiving device coupled with the sending device, the receiving device configured to receive the packet,
    store the arrival time of the packet,
    store the transport header, for each packet with the flag set to true,
    accumulate the packets size and inter packet arrival time,
    calculate a total bytes divided by a total time, and generate a bandwidth report.

16. The system for measuring bandwidth of a network connection as recited in claim 15, wherein the sending device is further configured to continue to transmit packets with the transport header flag set to true while measuring the bandwidth.

17. A non-transitory machine readable medium having sets of instructions stored thereon which, when executed by one or more machines, cause the one or more machine to:
- establish the network connection between a sending terminal and a receiving terminal;
- insert a flag into a packet header for at least one packet wherein the flag is to indicate to the receiving terminal that a bandwidth measurement is in progress, wherein the at least one packet includes a payload;
- determine if a time interval since a previous packet was transmitted is less than a threshold, based on the time interval being less than the threshold set the flag in the packets header of the at least one packet to true;
- transmit to the receiving terminal the at least one packet;
- store the arrival time of the at least one packet;
- store the packet header, for each packet with the flag set to true;
- sum arrival times of the at least one packet and the payload for the at least one packet; and
- calculate the bandwidth measurement of the network connection by dividing the summed payload value by the summed arrival times value;
- generate a bandwidth report.

18. The machine-readable medium as recited in claim 17, wherein the sets of instructions which, when further executed by the one or more machines, cause the one or more machine to set the flag in each of the packet headers in a plurality of packets to false.

19. The machine-readable medium as recited in claim 18, wherein the setting of the flag to false indicates to the receiving terminal that a bandwidth test is not being initiated.

20. The machine-readable medium as recited in claim 19, wherein the setting of the flag to true indicates to the receiving terminal that a bandwidth test is being initiated.

* * * * *